(12) United States Patent
Kitsche

(10) Patent No.: US 9,352,854 B2
(45) Date of Patent: May 31, 2016

(54) SPACE FLIGHT DRIVE AND FLIGHT CRAFT

(71) Applicant: Deutsches Zentrum fuer Luft- und Raumfahrt e.V., Cologne (DE)

(72) Inventor: Wolfgang Kitsche, Jagsthausen (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 322 days.

(21) Appl. No.: 14/087,031

(22) Filed: Nov. 22, 2013

(65) Prior Publication Data

US 2014/0158831 A1    Jun. 12, 2014

(30) Foreign Application Priority Data

Nov. 30, 2012 (DE) .......................... 10 2012 111 681

(51) Int. Cl.
*B64G 1/40* (2006.01)

(52) U.S. Cl.
CPC ............. *B64G 1/401* (2013.01); *B64G 1/402* (2013.01)

(58) Field of Classification Search
CPC ............ F02K 9/42; B64G 1/40; B64G 1/401; B64G 1/402
USPC ............................................ 244/171.1, 171.3
See application file for complete search history.

(56) References Cited

U.S. PATENT DOCUMENTS

| | | | | |
|---|---|---|---|---|
| 3,176,464 A | * | 4/1965 | Meyer et al. | 60/233 |
| 3,221,497 A | * | 12/1965 | Forbes, Jr. | 60/251 |
| 4,327,885 A | * | 5/1982 | Blevins et al. | 244/3.24 |
| 4,519,208 A | * | 5/1985 | Loisy et al. | 60/262 |
| 4,723,736 A | * | 2/1988 | Rider | B64G 1/002 102/377 |
| 5,191,761 A | * | 3/1993 | Janeke | 60/224 |
| 6,293,091 B1 | * | 9/2001 | Seymour et al. | 60/225 |
| 8,056,319 B2 | * | 11/2011 | Bulman et al. | 60/225 |

FOREIGN PATENT DOCUMENTS

| | | |
|---|---|---|
| DE | 1 301 649 | 8/1969 |
| DE | 103 25 170 | 12/2004 |
| WO | WO 2012/116398 | 9/2012 |

OTHER PUBLICATIONS

Young, et al., "Lazarus: A SSTO Hypersonic Vehicle Concept Utilizing RBCC and HEDM Propulsion Technologies", 14th AIAA/AHI Space Planes and Hypersonic Systems and Technologies Conference, American Institute of Aeronautics and Astronautics, pp. 1-14, 2006.

* cited by examiner

*Primary Examiner* — Christopher P Ellis
*Assistant Examiner* — Richard G Davis
(74) *Attorney, Agent, or Firm* — Lipsitz & McAllister, LLC

(57) ABSTRACT

In order to produce a space flight drive for propelling a spacecraft which can use the available fuel with great efficiency and which can transport heavy payloads to great heights, it is proposed that the space flight drive should comprise a fuel tank for holding a fuel, an oxidizer tank for holding an oxidizer, a combustion chamber device for the conversion of the fuel by the oxidizer, a propulsion nozzle device adjoining the combustion chamber device and a shroud device which surrounds the propulsion nozzle device annularly at least in sections for the production of an air sheath flow during a flight of the spacecraft through the atmosphere.

11 Claims, 4 Drawing Sheets

SPACE FLIGHT DRIVE AND FLIGHT CRAFT

This application claims the benefit of German application number 10 2012 111 681.4 filed on Nov. 30, 2012, which is incorporated herein by reference in its entirety and for all purposes.

FIELD OF DISCLOSURE

The present invention relates to a space flight drive for propelling a spacecraft in a direction of flight of the spacecraft for the purposes of transporting a payload into space and in particular into an orbit.

BACKGROUND

Rockets are known from the field of armaments for example which comprise a sheath flow rocket engine. In comparison with rocket engines without a sheath flow arrangement, those utilising sheath flow enable a higher thrust to be obtained in certain circumstances.

For example, DE 103 25 170 A1 discloses a rocket in which an increase in thrust is obtained by means of an engine shroud. However, the rocket known from DE 103 25 170 A1 is not suitable for space flight drives because, in particular, fuel is supplied to the sheath flow which does indeed lead to an increase in the thrust but there is a simultaneous lowering of the efficiency.

SUMMARY OF THE INVENTION

The object of the present invention is to provide a space flight drive, in particular, a main stage engine or a sub-stage engine which can use the available fuel in a highly efficient manner and can transport heavy payloads to great heights.

In accordance with the invention, this object is achieved by a space flight drive for propelling a spacecraft in a direction of flight of the spacecraft for the purposes of transporting a payload into space, in particular into an orbit, wherein the space flight drive comprises the following:
  a fuel tank for holding a fuel;
  an oxidizer tank for holding an oxidizer;
  a combustion chamber device for the conversion of the fuel by the oxidizer;
  a propulsion nozzle device adjoined to the combustion chamber device; and
  a shroud device surrounding the propulsion nozzle device annularly at least in sections for the production of an air sheath flow during a flight of the spacecraft through the atmosphere.

Due to the fact that in the space flight drive in accordance with the invention there is provided a shroud device which surrounds the propulsion nozzle device at least in sectional ring-like manner, the available fuel can be used in a highly efficient manner by means of the space flight drive. Consequently, heavy payloads can be transported to great heights.

It can be advantageous if the shroud device comprises an interior space which is tapered in a direction opposed to the direction of flight.

In particular, a direction oriented in a direction opposed to the direction of flight is the direction of the air flow relative to the spacecraft when the spacecraft is in flight.

It can be expedient if an inner surface of the shroud device comprises a tapering section or if the entire inner surface of the shroud device is formed in tapering manner so that an inner cross-sectional area of the shroud device taken perpendicularly to the direction of flight reduces in a direction opposed to the direction of flight, i.e. along the direction of the air flow.

It can be advantageous if the interior space of the shroud device tapers continuously and/or constantly commencing from a front end of the shroud device taken with respect to the direction of flight.

In particular, a continual tapering is to be understood as a continual reduction of the cross-sectional area taken perpendicularly to the direction of flight without any local increase of the cross-sectional area in a direction opposed to the direction of flight.

In particular, a constant tapering is to be understood as a tapering which does not exhibit any step-like, abrupt change of cross-sectional area in a direction opposed to the direction of flight. A constant tapering is, in particular, a uniform e.g. linear reduction of the cross-sectional area.

In one embodiment of the invention, provision is made for the interior space of the shroud device to taper continuously and/or constantly commencing from a front end of the shroud device taken with respect to the direction of flight up to a rear end of the shroud device taken with respect to the direction of flight.

In particular, if the shroud device is at least approximately in the form of a hollow cylinder or a hollow truncated cone, provision may be made for an internal diameter of the shroud device to continuously and/or constantly decrease in a direction opposed to the direction of flight.

It can be expedient if an outer surface of the shroud device comprises a constant section in which an outer cross-sectional area taken perpendicularly to the direction of flight is at least approximately constant in a direction opposed to the direction of flight.

In particular, provision may be made for an outer cross section of the shroud device taken perpendicularly to the direction of flight to be at least approximately constant along the direction of flight in the constant section of the shroud device.

The constant section of the shroud device, in particular the outer surface of the shroud device, preferably extends approximately over at least half the length of the shroud device along the direction of flight.

Particularly in the case of the shroud device being at least approximately rotationally symmetrical, the outer diameter of the shroud device is preferably substantially constant in the region of the constant section of the shroud device.

In the constant section thereof, the outer surface of the shroud device preferably corresponds at least approximately to the surface of a circular cylinder.

It can be expedient if a longitudinal section of the shroud device is at least approximately in the form of a triangle along a plane extending through an axis of symmetry of the shroud device.

It can be advantageous if an outer surface of the shroud device comprises a tapering section in which an outer cross-sectional area taken perpendicularly to the direction of flight decreases in a direction opposed to the direction of flight.

In particular, provision may be made for an outer surface of the shroud device to comprise a tapering section in which an outer cross-sectional area taken perpendicularly to the direction of flight decreases continuously and/or constantly, in particular linearly, in a direction opposed to the direction of flight.

In particular, if the outer surface of the shroud device comprises a constant section and a tapering section, provision may be made for a transition between the constant section and the tapering section to be rounded off. Preferably, detachment of the air flow that is flowing around the shroud device can thereby be prevented.

In one embodiment of the invention, provision is made for a front end of the shroud device taken with respect to the direction of flight to be arranged laterally adjacent to the propulsion nozzle device and/or the combustion chamber device. In particular, a laterally adjacent arrangement is to be understood as an arrangement, in particular an arrangement at the same level taken with respect to the direction of flight, which is adjacent in a direction running perpendicularly to the direction of flight (transverse direction).

The air sheath flow is preferably guided between the propulsion nozzle device and the shroud device.

It can be expedient if an outer surface of the propulsion nozzle device comprises a flow guidance device for the guidance of the air sheath flow.

The space flight drive can, for example, be an engine stage that is separable from a transport device for holding a payload such as a sub-stage engine and/or a main stage engine for example.

As an alternative thereto, provision may be made for the space flight drive to be inseparably connected to the transport device for holding the payload.

The shroud device can comprise a ceramic material or be formed from a ceramic material.

The ceramic material may be a carbide-ceramic material and in particular silicon carbide for example.

As an alternative or in addition thereto, provision may be made for the shroud device to comprise a metallic material or be formed from a metallic material.

For example, provision may be made for the shroud device to be formed at least in sections of a titanium sheet.

It can be expedient if the shroud device is formed and the combustion chamber device is controllable and/or regulatable, for example by means of a control device, in such a manner that a propulsion jet emerging from the propulsion nozzle device comprises an excess of fuel which is convertible with oxygen from the air sheath flow being fed through the shroud device for the purposes of increasing the thrust.

The space flight drive preferably does not employ fuel injection for the air sheath flow. Rathermore, it is preferable that use be made exclusively of excess fuel in the propulsion jet for increasing the thrust.

The space flight drive in accordance with the invention is particularly suitable for use in a spacecraft for transporting a payload into space, in particular into an orbit.

Consequently, the present invention also relates to a spacecraft for the transportation of a payload into space, in particular into an orbit.

In this respect, the object of the invention is to provide a spacecraft by means of which the available fuel can be used highly efficiently in order to transport heavy payloads to great heights.

In accordance with the invention, this object is achieved by a spacecraft for the transportation of a payload into space, in particular into an orbit, wherein the spacecraft comprises the following:
 a transport device for holding a payload; and
 a space flight drive in accordance with the invention.

The spacecraft in accordance with the invention preferably comprises individual ones or a plurality of the features and/or advantages that have been described in connection with the space flight drive in accordance with the invention.

The space flight drive can, for example, be inseparably connected to the transport device.

As an alternative thereto, provision may be made for the space flight drive, in particular a combustion chamber device, a propulsion nozzle device and/or a shroud device of the space flight drive, to be separable from the transport device for holding the payload.

It can be expedient if the shroud device is arranged at least in sections within a projection of the outer contour of the transport device along a longitudinal axis of the transport device.

In connection therewith, a projection of the outer contour of the transport device along a longitudinal axis of the transport device is to be understood as being that spatial region which is encompassed by the largest cross-sectional area of the transport device taken perpendicularly to the direction of flight when this largest cross-sectional area is displaced along the longitudinal axis of the transport device up to the ends of the spacecraft.

Thus, commencing from the longitudinal axis of the transport device (in the transverse direction), an object that is arranged within a projection of the outer contour of the transport device does not project laterally beyond the transport device.

In particular, an object that is arranged within the projection of the outer contour of the transport device along the longitudinal axis of the transport device and is behind the transport device with respect to the direction of flight of the spacecraft such as the combustion chamber device, the propulsion nozzle device and/or the shroud device for example is not visible in a plan view of a front end of the spacecraft with respect to the direction of flight of the spacecraft when viewed along the longitudinal axis of the transport device.

Objects arranged within the projection of the outer contour of the transport device along the longitudinal axis and located behind the transport device preferably have very little negative effect upon the aerodynamics, in particular, on the air resistance of the spacecraft during the flight of the spacecraft through the atmosphere.

It can be advantageous if the shroud device is arranged at least approximately entirely within a projection of the outer contour of the transport device along a longitudinal axis of the transport device.

Consequently, the shroud device preferably does not project laterally beyond the outer contour of the transport device.

It can be particularly expedient if an outer cross-sectional area, in particular the largest outer cross-sectional area of the transport device, corresponds to an outer cross-sectional area and in particular the largest outer cross-sectional area of the shroud device.

However, provision could also be provided for the shroud device to project laterally beyond the transport device, for example, to have an at least approximately 2% and/or at most approximately 20% larger outer diameter.

Preferably, the transport device, the combustion chamber device, the propulsion nozzle device and/or the shroud device have a common axis of symmetry and/or longitudinal axis.

The transport device and/or a connecting element for connecting the combustion chamber device and the propulsion nozzle device to the transport device preferably comprises a section which tapers in a direction opposed to the direction of flight of the spacecraft.

Due to the section which tapers in a direction opposed to the direction of flight of the spacecraft, there is preferably created behind the transport device with respect to the direction of flight of the spacecraft a region in which components of the spacecraft can be arranged without substantially negatively impairing the aerodynamics of the spacecraft and in particular the air resistance of the spacecraft during its flight through the atmosphere.

Furthermore, the space flight drive in accordance with the invention and/or the spacecraft in accordance with the invention may comprise individual ones or a plurality of the features and/or advantages described below:

Preferably, an air flow is supplied at least part of the time to the propulsion jet by means of the shroud device, wherein the flow volume of the air flow amounts to at least approximately 30%, at least approximately 50% for example, and/or at most approximately 100%, in particular, at most approximately 80% of the flow volume of the propulsion jet.

Preferably, an annular channel is formed by means of the shroud device.

The annular channel can be formed from a ceramic material, a titanium sheet and/or a carbon-fibre-reinforced synthetic material (CFRP) for example.

Preferably, the shroud device enables a two digit percentage increase in thrust to be obtained, for example, of at least approximately 10% and in particular of several tons.

The air resistance when air is flowing past the propulsion nozzle device which results from cooling fins on the outer surface of the propulsion nozzle device for example can preferably be reduced by means of a flow guidance system on an outer surface of the propulsion nozzle device.

Preferably, merely an ejector effect is used by means of the shroud device.

A high specific drive impulse can preferably be obtained by means of the space flight drive in accordance with the invention.

An aerodynamic and in some cases problematic flow past the propulsion nozzle device is preferably prevented and, in particular, is used for increasing the thrust by means of the shroud device.

The channel geometry of the annular channel formed by means of the shroud device is preferably selected in such a way that aerodynamic losses are minimized.

Preferably, an outer flow past the propulsion nozzle device is used for the purposes of increasing the thrust.

The available fuel can be used particularly efficiently by means of the space flight drive in accordance with the invention thereby enabling heavy payloads to be transported into an orbit around the earth, to the moon and/or to other planets.

In principle, the sheath flow principle in accordance with the invention can be used with all space flight drives which are used partly for flight through the atmosphere. The space flight drive in accordance with the invention can be advantageous in particular for rockets wherein a high specific impulse is of interest. Preferably thereby, an increase in thrust is possible without need for additional fuel.

The extra thrust is preferably significantly higher than the mass of the shroud device so that, despite the additional shroud device, it is possible to obtain a net increase in thrust which can be used directly for increasing the payload of the spacecraft.

Further preferred features and/or advantages of the invention form the subject matter of the following description and the graphical illustration of exemplary embodiments.

BRIEF DESCRIPTION OF THE DRAWINGS

Similar or functionally equivalent elements are provided with the same reference symbols in all the Figures.

DETAILED DESCRIPTION OF THE DRAWINGS

Figure 1:
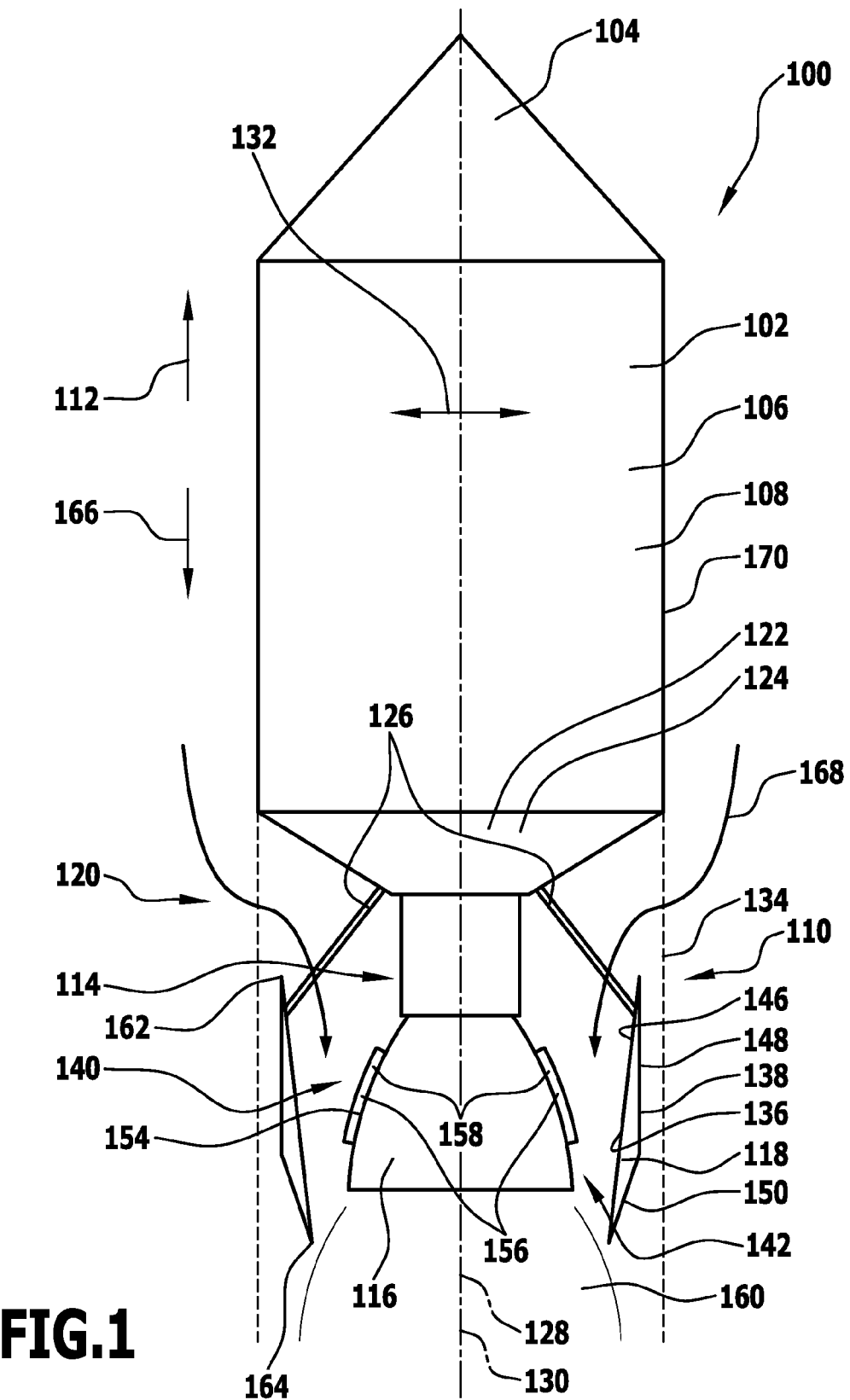
FIG. 1 shows a schematic longitudinal section through a first embodiment of a spacecraft.
Figure 2:
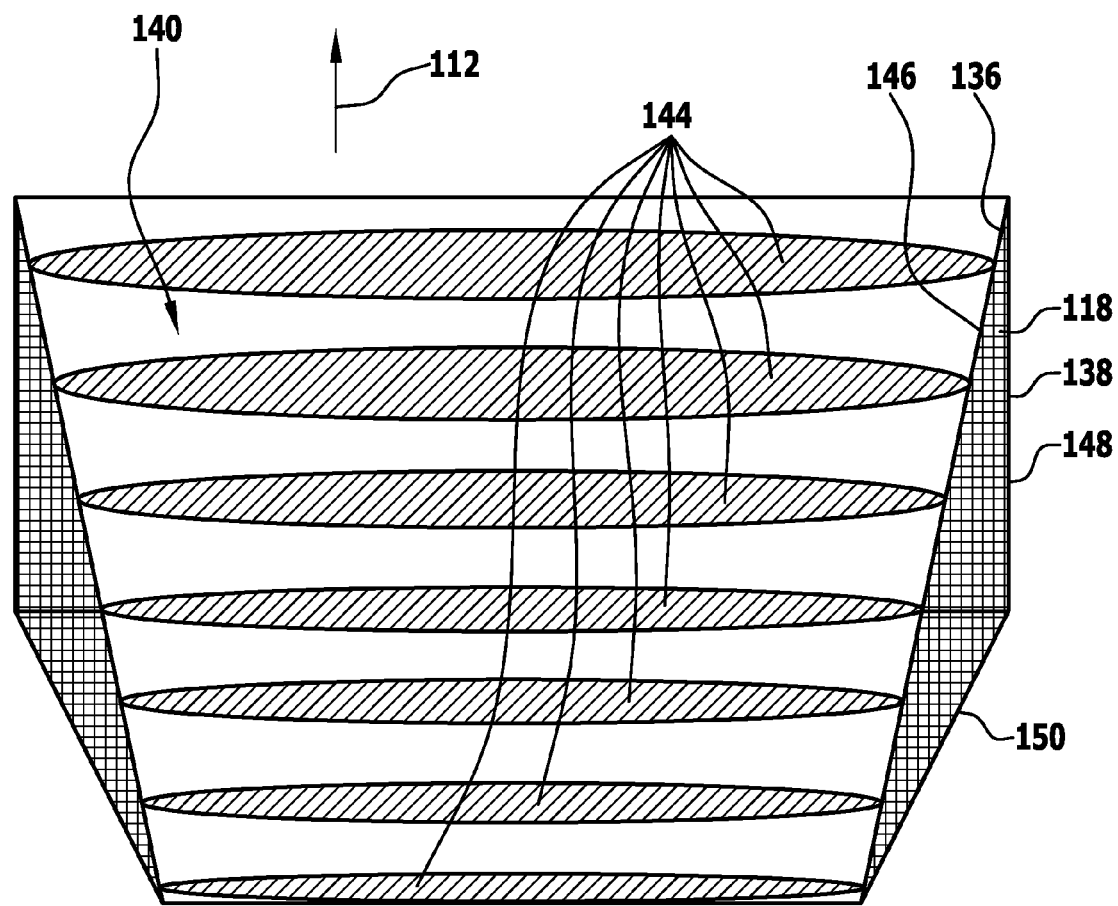
FIG. 2 a schematic illustration of a shroud device of a space flight drive of the spacecraft depicted in FIG. 1 for illustrating the internal geometry of the shroud device.
Figure 3:
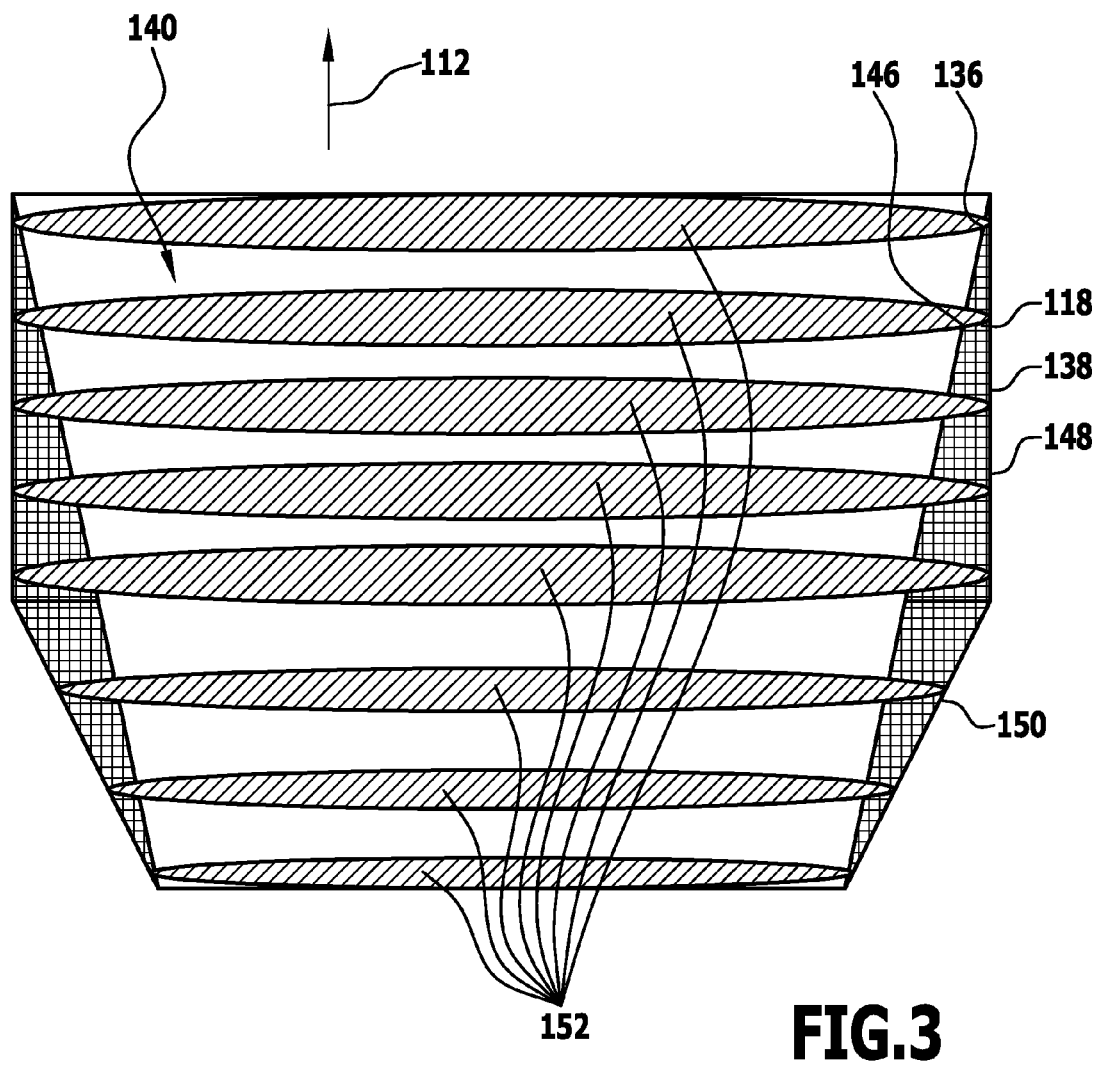
FIG. 3 a schematic illustration corresponding to FIG. 2 of the shroud device for illustrating the external geometry of the shroud device.

A first embodiment of a spacecraft 100 bearing the general reference 100 is illustrated in FIGS. 1 to 3 and comprises a transport device 102 for holding a payload 104, a fuel tank 106 and an oxidizer tank 108.

Furthermore, the spacecraft 100 comprises a space flight drive 110 for propelling the spacecraft 100 in a direction of flight 112 of the spacecraft 100.

The space flight drive 110 comprises a combustion chamber device 114 for the chemical conversion of the fuel from the fuel tank 106 by the oxidizer from the oxidizer tank 108, a propulsion nozzle device 116 adjoining the combustion chamber device 114 and a shroud device 118.

The space flight drive 110 is, in particular, an engine stage 120 of the spacecraft 100 such as a sub-stage engine or a main stage engine for example.

The space flight drive 110 and in particular the combustion chamber device 114, the propulsion nozzle device 116 and the shroud device 118 are connected to the transport device 102 of the spacecraft 100 either inseparably or in releasable manner.

The combustion chamber device 114 is connected to the transport device 102 by means of a connecting element 122.

In particular, the connecting element 122 is in the form of a tapering section 124 of the transport device 102.

For the purposes of attaching the shroud device 118, there are provided a plurality of fastening elements 126 such as rod-like fastening elements 126 for example, which connect the shroud device 118 to the connecting element 122 for example.

The transport device 102, the combustion chamber device 114, the propulsion nozzle device 116 and the shroud device 118 are at least approximately rotationally symmetrical about a common axis of symmetry 128 which simultaneously forms a longitudinal axis 130 of the spacecraft 100.

The combustion chamber device 114, the propulsion nozzle device 116 and the shroud device 118 are dimensioned such that these devices 114, 116, 118 do not project beyond the transport device 102 in a transverse direction 132 oriented perpendicularly with respect to the longitudinal axis 130.

The combustion chamber device 114, the propulsion nozzle device 116 and the shroud device 118 are thus arranged within an outer contour 134 of the transport device 102.

In particular hereby, the outer contour 134 is that spatial region which is encompassed by a largest external cross section of the transport device 102 when it is moved along the longitudinal axis 130.

The shroud device 118 comprises an inner surface 136 which faces the axis of symmetry 128 and an outer surface 138 which faces away from the axis of symmetry 128.

An interior space 140 surrounded by the shroud device 118 comprises, preferably at least in sections, the combustion chamber device 114 and/or the propulsion nozzle device 116 as well as an annular channel 142 that is formed by means of the shroud device 118 and the propulsion nozzle device 116.

The inner surface 136 of the shroud device 118 is a generated surface of a truncated cone for example.

In particular, the inner surface 136 of the shroud device 118 tapers in a direction opposed to the direction of flight 112 of the spacecraft 100 so that an inner cross-sectional area 144 of the shroud device 118 taken perpendicularly relative to the axis of symmetry 128 and surrounded by the inner surface 136 of the shroud device 118 decreases in a direction opposed to the direction of flight 112.

The inner cross-sectional area 144 of the shroud device 118 thereby decreases, particularly, linearly in a direction opposed to the direction of flight 112. Unwanted turbulences on the inside of the shroud device 118 and particularly in the annular channel 142 can thereby be prevented.

The inner surface 136 of the shroud device 118 thus forms a tapering section 146 of the shroud device 118.

The outer surface 138 of the shroud device 118 comprises a constant section 148 and a tapering section 150.

As can be gathered in particular from FIG. 3, an outer cross-sectional area 152 of the shroud device 118 is substantially constant in the region of the constant section 148 of the outer surface 138 along or in a direction opposed to the direction of flight 112.

In the region of the tapering section 150 of the outer surface 138 of the shroud device 118, the outer cross-sectional area 152 decreases in a direction opposed to the direction of flight 112 of the spacecraft 100.

Due to the tapering section 146 of the inner surface 136, the tapering section 150 of the outer surface 138 and the constant section 148 of the outer surface 138, the shroud device 118 is at least approximately in the form of a triangle in a longitudinal section.

On an outer surface 154 of the propulsion nozzle device 116, the propulsion nozzle device 116 preferably comprises a flow guidance device 156, for example, a plurality of flow guidance elements 158. Preferably, the air being guided in the annular channel 142 can be supplied in targeted manner by means of such flow guidance elements 158 to a propulsion jet 160 that is being produced by means of the propulsion nozzle device 116. Furthermore, the air resistance of the propulsion nozzle device 116 can preferably be reduced by means of the flow guidance elements 158.

Both a front end 162 of the shroud device 118 with respect to the direction of flight 112 and a rear end 164 of the shroud device 118 with respect to the direction of flight 112 are preferably pointed in order to prevent unwanted air turbulences.

When the spacecraft 100 is operational especially when flying through the atmosphere, then, relative to the spacecraft, the air flows past the spacecraft 100 in a direction of flow 166 that is opposed to the direction of flight 112.

Consequently, due to the tapering section 124 of the transport device 102, an air flow 168 is directed into the annular channel 142 which is formed by means of the shroud device 118.

This air flow 168 is configured to be supplied to the propulsion jet 160 as a sheath air flow by means of the shroud device 118, in particular, by means of the annular channel 142 and the propulsion nozzle device 116.

The previously described first embodiment of the spacecraft 100 functions as follows:

For the purposes of propelling the spacecraft 100 by means of the space flight drive 110, fuel from the fuel tank 106 such as hydrogen and oxidizer from the oxidizer tank 108 such as oxygen are burned in the combustion chamber device 114 and expanded in the propulsion nozzle device 116 so as to produce the thrust.

The propulsion jet 160 in particular is thus produced by means of the propulsion nozzle device 116 whereby the spacecraft 100 is accelerated due to the recoil effect.

A stream of air flows around the spacecraft 100 during its flight through the atmosphere.

In particular thereby, a flow of air 168 flows into the shroud device 118 and in particular, into the annular channel 142 formed between the shroud device 118 and the propulsion nozzle device 116.

This air flow 168 is supplied to the propulsion jet 160 in targeted manner by means of the shroud device 118 so that additional oxygen in particular is supplied to the propulsion jet 160.

Since the propulsion jet 160 preferably comprises unburned fuel such as hydrogen in particular, the additional air and in particular the additional oxygen supplied by means of the shroud device 118 can be used for combustion of the hydrogen contained in the propulsion jet 160.

This additional combustion of the hydrogen contained in the propulsion jet 160 leads to better utilization of the fuel since it cannot escape through the propulsion nozzle device 116 in an unburned state, but is subjected to an after-burn process for increasing the thrust in the propulsion jet 160.

The spacecraft 100 can thus use the available fuel more efficiently. By the use of the shroud device 118 in particular, a payload of large mass can be carried to great heights, in particular, into an orbit, to the moon or to other planets.

Figure 4:
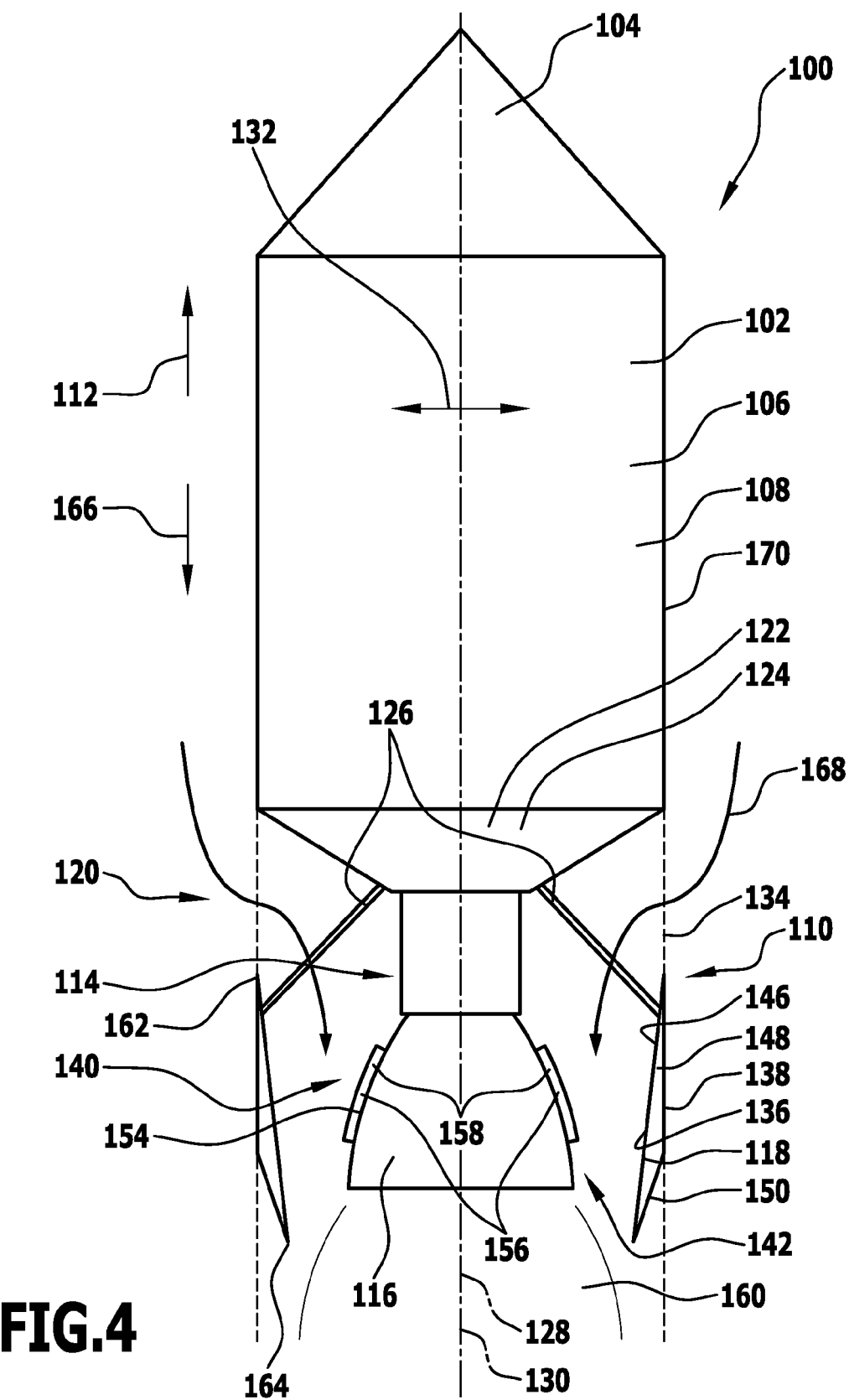
FIG. 4 a schematic illustration corresponding to FIG. 1 of a second embodiment of a spacecraft.

A second embodiment of a spacecraft 100 that is illustrated in FIG. 4 basically differs from the first embodiment illustrated in FIGS. 1 to 3 in that the shroud device 118 has a larger diameter.

In particular, the shroud device 118 in the second embodiment of the spacecraft 100 that is illustrated in FIG. 4 is dimensioned in such a way that the outer cross-sectional area 152 of the shroud device 118 in the constant section 148 of the outer surface 138 substantially corresponds to the largest outer cross-sectional area of the transport device 102 (without possible tail units).

An outer surface 170 of the transport device 102 and the constant section 148 of the outer surface 138 of the shroud device 118 are then, in particular, component parts of a surface of the outer contour 134 of the spacecraft 100.

In all other respects the second embodiment of the spacecraft 100 illustrated in FIG. 4 corresponds in regard to the construction and functioning thereof to the first embodiment illustrated in FIGS. 1 to 3, so that to this extent, reference should be made to the previous description thereof.

Further advantageous embodiments are the following:

1. Space flight drive for propelling a spacecraft (100) in a direction of flight (112) of the spacecraft (100) for the purposes of transporting a payload (104) into space, in particular into an orbit, comprising:
   a fuel tank (106) for holding a fuel;
   an oxidizer tank (108) for holding an oxidizer;
   a combustion chamber device (114) for the conversion of the fuel by the oxidizer;
   a propulsion nozzle device (116) adjoining the combustion chamber device (114); and
   a shroud device (118) surrounding the propulsion nozzle device (116) annularly at least in sections for the production of an air sheath flow during a flight of the spacecraft (100) through the atmosphere.

2. A space flight drive in accordance with embodiment 1, characterized in that the shroud device (118) comprises an interior space (140) which tapers in a direction opposed to the direction of flight (112).

3. A space flight drive in accordance with embodiment 2, characterized in that the interior space (140) of the shroud device (118) tapers continuously and/or constantly commencing with respect to the direction of flight (112) from a front end (162) of the shroud device (118).
4. A space flight drive in accordance with embodiment 3, characterized in that the interior space (140) of the shroud device (118) tapers continuously and/or constantly commencing, with respect to the direction of flight (112), from a front end (162) of the shroud device (118) up to a rear end (164) of the shroud device (118) with respect to the direction of flight (112).
5. A space flight drive in accordance with any of the embodiments 1 to 4, characterized in that an outer surface (138) of the shroud device (118) comprises a constant section (148) in which an outer cross-sectional area (152) taken perpendicularly to the direction of flight (112) is at least approximately constant in a direction opposed to the direction of flight (112).
6. A space flight drive in accordance with any of the embodiments 1 to 5, characterized in that an outer surface (138) of the shroud device (118) comprises a tapering section (150) in which an outer cross-sectional area (152) taken perpendicularly to the direction of flight (112) decreases in a direction opposed to the direction of flight (112).
7. A space flight drive in accordance with any of the embodiments 1 to 6, characterized in that a front end (162) of the shroud device (118) with respect to the direction of flight (112) is arranged laterally adjacent to the propulsion nozzle device (116) and/or to the combustion chamber device (114).
8. A space flight drive in accordance with any of the embodiments 1 to 7, characterized in that an outer surface (154) of the propulsion nozzle device (116) comprises a flow guidance device (156) for the guidance of the air sheath flow.
9. A space flight drive in accordance with any of the embodiments 1 to 8, characterized in that the space flight drive (110) is an engine stage (120) that is separable from a transport device (102) for holding a payload (104).
10. A space flight drive in accordance with any of the embodiments 1 to 9, characterized in that the shroud device (118) comprises a ceramic material or is formed from a ceramic material.
11. A space flight drive in accordance with any of the embodiments 1 to 10, characterized in that the shroud device (118) is formed and the combustion chamber device (114) is controllable and/or regulatable in such a manner that a propulsion jet (160) emerging from the propulsion nozzle device (116) comprises an excess of fuel which is convertible with oxygen from the air sheath flow being fed through the shroud device (118) for the purposes of increasing the thrust.
12. A spacecraft for the transportation of a payload (104) into space, in particular, into an orbit, comprising:
a transport device (102) for holding a payload (104); and
a space flight drive (110) in accordance with any of the embodiments 1 to 11.
13. A spacecraft in accordance with embodiment 12, characterized in that the shroud device (118) is arranged at least in sections within a projection of the outer contour (134) of the transport device (102) along a longitudinal axis (130) of the transport device (102).
14. A spacecraft in accordance with embodiment 13, characterized in that the shroud device (118) is arranged at least approximately entirely within a projection of the outer contour (134) of the transport device (102) along a longitudinal axis (130) of the transport device (102).
15. A spacecraft in accordance with any of the embodiments 12 to 14, characterized in that the transport device (102) and/or a connecting element (122) for connecting the combustion chamber device (114) and the propulsion nozzle device (116) to the transport device (102) comprises a section (124) which tapers in a direction opposed to the direction of flight (112) of the spacecraft (100).

LIST OF REFERENCE SYMBOLS 100 spacecraft
102 transport device
104 payload
106 fuel tank
108 oxidizer tank
110 space flight drive
112 direction of flight
114 combustion chamber device
116 propulsion nozzle device
118 shroud device
120 engine stage
122 connecting element
124 tapering section
126 fastening element
128 axis of symmetry
130 longitudinal axis
132 transverse direction
134 outer contour
136 inner surface
138 outer surface
140 interior space
142 annular channel
144 inner cross-sectional area
146 tapering section
148 constant section
150 tapering section
152 outer cross-sectional area
154 outer surface
156 flow guidance device
158 flow guidance element
160 propulsion jet
162 front end
164 rear end
166 direction of flow
168 air flow
170 outer surface

The invention claimed is:
1. A spacecraft for the transportation of a payload into an orbit, comprising:
a transport device for holding the payload; and
a space flight drive for propelling the spacecraft in a direction of flight of the spacecraft for the purposes of transporting the payload into the orbit, comprising:
a fuel tank for holding a fuel;
an oxidizer tank for holding an oxidizer;
a combustion chamber device for conversion of the fuel by the oxidizer;
a propulsion nozzle device adjoining the combustion chamber device; and
a shroud device surrounding the propulsion nozzle device annularly at least in sections for production of an air sheath flow during the flight of the spacecraft through atmosphere;
wherein:
the space flight drive is an engine stage that is separable from the transport device for holding the payload; and the shroud device is arranged entirely inside of a projection of an outer contour of the transport device along a longitudinal axis of the transport device.

2. A spacecraft in accordance with claim 1, wherein the shroud device comprises an interior space which tapers in a direction opposed to the direction of flight.

3. A spacecraft in accordance with claim 2, wherein the interior space of the shroud device tapers at least one of continuously and constantly commencing with respect to the direction of flight from a front end of the shroud device.

4. A spacecraft in accordance with claim 3, wherein the interior space of the shroud device tapers at least one of continuously and constantly commencing, with respect to the direction of flight, from the front end of the shroud device up to a rear end of the shroud device with respect to the direction of flight.

5. A spacecraft in accordance with claim 1, wherein an outer surface of the shroud device comprises a constant section in which an outer cross-sectional area taken perpendicularly to the direction of flight is at least approximately constant in a direction opposed to the direction of flight.

6. A spacecraft in accordance with claim 1, wherein an outer surface of the shroud device comprises a tapering section in which an outer cross-sectional area taken perpendicularly to the direction of flight decreases in a direction opposed to the direction of flight.

7. A spacecraft in accordance with claim 1, wherein a front end of the shroud device with respect to the direction of flight is arranged laterally adjacent to at least one of the propulsion nozzle device and the combustion chamber device.

8. A spacecraft in accordance with claim 1, wherein an outer surface of the propulsion nozzle device comprises a flow guidance device for the guidance of the air sheath flow.

9. A spacecraft in accordance with claim 1, wherein the shroud device comprises a ceramic material or is formed from a ceramic material.

10. A spacecraft in accordance with claim 1, wherein the shroud device is formed and the combustion chamber device is at least one of controllable and regulatable in such a manner that a propulsion jet emerging from the propulsion nozzle device comprises an excess of fuel which is convertible with oxygen from the air sheath flow being fed through the shroud device for purposes of increasing thrust.

11. A spacecraft in accordance with claim 1, wherein at least one of the transport device and a connecting element for connecting the combustion chamber device and the propulsion nozzle device to the transport device comprises a section which tapers in a direction opposed to the direction of flight of the spacecraft.

* * * * *